(12) United States Patent
Gerstenkorn et al.

(10) Patent No.: US 8,820,486 B2
(45) Date of Patent: Sep. 2, 2014

(54) METHOD FOR DETERMINING A DESTINATION CALL FOR USE BY AN ELEVATOR INSTALLATION, AND AN ELEVATOR INSTALLATION

(75) Inventors: Bernhard Gerstenkorn, Ebikon (CH); Daniel Ottiger, Obernau/Lu (CH)

(73) Assignee: Inventio AG, Hergiswil (CH)

( * ) Notice: Subject to any disclaimer, the term of this patent is extended or adjusted under 35 U.S.C. 154(b) by 1161 days.

(21) Appl. No.: 12/740,062

(22) PCT Filed: Oct. 27, 2008

(86) PCT No.: PCT/EP2008/064556
§ 371 (c)(1),
(2), (4) Date: Sep. 6, 2011

(87) PCT Pub. No.: WO2009/056525
PCT Pub. Date: May 7, 2009

(65) Prior Publication Data
US 2012/0031711 A1 Feb. 9, 2012

(30) Foreign Application Priority Data
Oct. 29, 2007 (EP) .................................... 07119449

(51) Int. Cl.
*B66B 1/34* (2006.01)
*B66B 1/46* (2006.01)

(52) U.S. Cl.
CPC ......... *B66B 1/468* (2013.01); *B66B 2201/4676* (2013.01); *B66B 2201/4615* (2013.01); *B66B 2201/4653* (2013.01); *B66B 2201/4638* (2013.01)

USPC ........................................ 187/391; 187/247

(58) Field of Classification Search
CPC   B66B 1/3407; B66B 1/3446; B66B 2201/10; B66B 2201/103; B66B 2201/4615; B66B 2201/4638; B66B 2201/4653
USPC .......... 187/247, 380–388, 391–393, 396, 901
See application file for complete search history.

(56) References Cited

U.S. PATENT DOCUMENTS 6,108,535 A     8/2000  Moriya et al.
6,382,363 B1    5/2002  Friedli
6,828,918 B2 *  12/2004 Bowman et al. ............... 340/4.1

(Continued)

FOREIGN PATENT DOCUMENTS

EP        0 341 381 A1      11/1989
EP        0 699 617 A1       3/1996
WO    WO 2006/059983 A2      6/2006

*Primary Examiner* — Anthony Salata
(74) *Attorney, Agent, or Firm* — Fraser Clemens Martin & Miller LLC; William J. Clemens

(57) ABSTRACT

A method for determining a destination call for use by an elevator installation with a control unit and at least one destination call device includes ascertaining several destination calls and making them known to the user by the destination call device. A destination call is selected by a change in position of the user and/or a data communication is activated between the destination call device and a communications unit, which is carried by the user, within a defined range of a radio link section of the destination call device and thereupon a destination call is selected by a change in position of the communications unit inside or outside the radio link section. The selected destination call is communicated to the control unit for serving the destination call.

20 Claims, 4 Drawing Sheets

(56) References Cited

U.S. PATENT DOCUMENTS

| | | | |
|---|---|---|---|
| 6,902,041 B2* | 6/2005 | Eccleston | 187/380 |
| 6,986,408 B2* | 1/2006 | Takeuchi | 187/380 |
| 7,031,525 B2* | 4/2006 | Beardsley | 382/199 |
| 7,079,669 B2* | 7/2006 | Hashimoto et al. | 382/118 |
| 7,207,422 B2* | 4/2007 | Takeuchi | 187/391 |
| 7,377,364 B2* | 5/2008 | Tyni et al. | 187/380 |
| 7,496,445 B2* | 2/2009 | Mohsini et al. | 701/434 |
| 8,505,693 B2* | 8/2013 | Koba | 187/387 |
| 2003/0080851 A1 | 5/2003 | Gerstenkorn | |
| 2003/0098776 A1 | 5/2003 | Friedli | |
| 2006/0164208 A1* | 7/2006 | Schaffzin et al. | 340/5.64 |
| 2007/0026802 A1 | 2/2007 | Gerstenkorn | |
| 2007/0045051 A1 | 3/2007 | Gerstenkorn | |
| 2008/0290990 A1* | 11/2008 | Schaffzin et al. | 340/5.64 |
| 2012/0168262 A1* | 7/2012 | Finschi | 187/392 |
| 2014/0014444 A1* | 1/2014 | Kauppinen et al. | 187/389 |
| 2014/0094997 A1* | 4/2014 | Hyde et al. | 701/2 |

* cited by examiner

METHOD FOR DETERMINING A DESTINATION CALL FOR USE BY AN ELEVATOR INSTALLATION, AND AN ELEVATOR INSTALLATION

FIELD OF THE INVENTION

The invention relates to a method for determining a destination call for use by an elevator installation with a control unit and at least one destination call device. The invention further relates to an elevator installation.

BACKGROUND OF THE INVENTION

An elevator installation with a recognition device for recognition of calls issued at floors is known from EP 0 699 617 A1. A control unit determines, by means of an allocation algorithm, a suitable elevator for serving the desired destination call and indicates this to the elevator user by means of a display device or acoustically. The recognition device is equipped for automatically reading data from an information transmitter carried by the user and passing on the data to the control unit. If, however, the user would like to select a travel destination different from the travel destination made known by the display unit he or she has to do this by way of a button input at the recognition unit. In this connection the disadvantage results that the recognition device is a publicly accessible device which is used by a multiplicity of persons, whereby the risk exists, particularly through contact with fingers, of transmission of illnesses.

SUMMARY OF THE INVENTION

The invention has the object of indicating a method for determining a destination call for the use of an elevator installation, in which the detection of the destination call is possible substantially with avoidance of contact with control units. Moreover, an associated elevator installation shall be indicated.

For fulfilment of this object it is provided in accordance with the invention, in the case of a method for determining a destination call for use by an elevator installation with a control unit and at least one destination call device, that the method comprises the following steps:
  activating a data communication between the destination call device and a communications unit, which is carried by the user, within a specific range of a radio link section and the communications unit;
  positioning the carried communications unit by a movement or substantially keeping still in the radio link section;
  determining a change in position of the communications unit as a radio signal of greater or lesser strength; and
  converting this detected radio signal into at least one destination call selection signal.

The method according to the invention is based on the recognition that the user solely by changing the position of the communications unit can interactively and contactlessly select a specific destination call from several destination calls ascertained by the destination call device or the control unit.

As a consequence of this contactless selection possibility of the destination call or of the travel destination, contact with the destination call device used by a multiplicity of persons is avoided. This proves advantageous in terms of hygiene, so that, in particular, no illnesses can be transmitted.

In a preferred development of the method a user is positioned by a movement or by keeping substantially still. A movement of the user is detected as a positive or negative movement signal. The detected movement signal is converted into a destination call selection signal.

By "change in position" of the user and/or of the communications unit there should be understood within the scope of the present invention that the desired destination call can be selected and with respect thereto optionally changed in advance in that the user and/or the communications unit is or are moved or kept substantially still. The extent of the movement and/or keeping still can move within the range of predetermined spatial and/or temporal limits.

In an advantageous development of the invention it is provided that the destination call device is equipped with at least one movement sensor and the user changes his or her position, i.e. moves or keeps still, in such a manner that the movement sensor detects a positive or negative movement signal.

In a further advantageous development of the method it is provided that the communications unit is so positioned by the user in the radio link section, i.e. is moved or kept still, that the destination call device detects a radio signal of greater or lesser strength from the communications unit.

The change in position of the user and/or of the communications unit is thus detected by the destination call device as a positive or negative movement signal or as a radio signal of greater or lesser strength and is converted into a destination call selection signal. For this purpose the destination call device preferably comprises a screen on which the destination call device can make known several fields with possible destination calls to the user. For example, a destination call is associated with each field. According to the destination call selection signal, for example, an indicator or cursor is guided over the fields with possible destination calls and stopped over a desired destination call. For example, the indicator is guided over the fields with possible destination calls until a negative movement signal or a strong radio signal is detected and the indicator stops its running over the fields with possible destination calls as soon as a positive movement signal or a weak radio signal is detected. Through stopping of the indicator a field is marked and the selection of an associated destination call actuated. The indicator is, for example, guided over the individual fields after a predetermined period of time in a specific sequence.

The method according to the invention makes it possible for the user, through change in position of the user and/or of the communications unit, to undertake an own selection of a destination call preferred by him or her so that there is no predetermination for him or her of an elevator ascertained by a computer by the destination call control from purely logistical and economic viewpoints. The user can thus select that destination call which best corresponds with his or her individual needs and which is preferred from his or her view for the respective situation.

A mobile communications means able to be carried by the user, for example a mobile telephone or a contactlessly readable RFID card, can be used as the communications unit.

The radio link section is preferably a near radio link section. The range of the near radio link section is preferably less than approximately 10 meters, preferably less than 1 meter.

Advantageously, the destination call can be selected in that the communications unit is moved out of a near radio link section, wherein there is selection from several fields with possible destination calls on the screen of that destination call of which the associated field has last been marked by the indicator. In other words, through interruption of the communication between communications unit and destination call device the pointer or cursor is stopped and the travel destination or destination call, in the associated field of which the indicator is located on the screen, is selected.

In a preferred development of the invention an automatic detection of a movement signal of the user takes place by the movement sensor. Analogously, an activation of the data communication between the destination call device and the communications unit within the near radio link section takes place in a self-acting manner or automatically. The activation can selectably also be carried out by actuation of the communications unit within the near radio link section. In this manner a completely contactless use of the elevator installation, i.e. particularly without contact of the destination call device, can take place.

Thus, the data communication is automatically established after approach to the destination call device, the user is automatically recognized and the several destination calls are similarly automatically ascertained. The destination call device can then make known a destination call list with a predetermined sequence of the destination calls and can preliminarily mark the destination call given at the first place in the destination call list. If the user decides on the preliminarily marked destination call, this is automatically selected and passed on to the control unit.

The screen is preferably a touchscreen, which functions as a destination call terminal so that the selection is also possible by actuation of, for example, a keyboard of the destination call device. This then proves advantageous, for example, if a mobile telephone carried by the user as communications unit is not in operation due to a discharged battery.

According to a further preferred embodiment the destination calls are indicated acoustically, optically and/or by vibration by means of the communications unit and/or the destination call device.

In a preferred embodiment an identification signal for identification of the user is transmitted by the user and/or the communications unit to the destination call device. The user for this purpose preferably inputs an identification code at a terminal, which input identification code is transmitted as an identification signal to the destination call device and/or the communications unit transmits an identification signal to the destination call device. The terminal can be a destination call terminal of an elevator installation, at which elevator calls such as destination calls can be input by, for example, speech recognition and/or as a biometric signal and/or by way of a keyboard or the terminal can be the communications unit itself, for example a mobile telephone. The communication of an identification signal from the communications unit to the destination call device can equally take place, for example, after activation of the data communication between the destination call device and the communications unit.

The destination call device checks the communicated identification signal and only then ascertains the several possible destination calls and makes known the ascertained possible destination calls to the user and/or the communications unit only when the check of the identification signal is successful.

Moreover, alternatively or additionally an access authorization code can be transmitted from the user and/or the communications unit to the destination call device and it can thereupon be checked from the destination call device whether the user has an access authorization for the building. For example, the authorization can be granted only at specific times or only for specific regions within a building. The several possible destination calls are only then ascertained by the destination call device and the ascertained possible destination calls are made known to the user only when the check of the access authorization is successful.

Moreover, it is of advantage if data for guidance of the user to an elevator are communicated to the destination call device and/or the communications unit. This advantageously takes place after communication of the selected destination call to the control unit, so that the user can on the basis of these data move to the elevator intended for serving the destination call while this elevator is moved to the floor at which the user will enter the elevator. These data can be communicated to the destination call device and/or directly to the communications unit. The data can be communicated to the user, for example, acoustically and/or optically.

With respect to the ascertaining, making known and selection of the destination call or destination calls it is preferably provided that at least one of the destination calls is recommended by the destination call device. This can be, for example, the destination call selected most frequently by the respective user. Moreover, the destination calls of greatest probability can be made known. In addition, a restricted number of destination calls can be made known by the destination call device. In order to further simplify the selection it can preferably be provided that the ascertained destination calls are automatically marked in succession in a predetermined sequence. This is preferably carried out by a colored background of the fields, which illustrate the different destination calls, on a screen. In this connection the colored background can take place over a certain period of time, for example one to two seconds, for each individual field. In order to, for example, be able to detect those destination calls with the greatest frequency the ascertained and/or made-known destination calls are stored. In this manner a travel profile can be created, which further simplifies selection of the destination call by the user. The destination calls are preferably made known in stepped sequence with the greatest probabilities.

Beyond this, for fulfilment of the above-mentioned object there is proposed an elevator installation with at least one elevator, a control unit and at least one destination call device. The destination call device makes known several possible destination calls to the user. The destination call device comprises a selecting unit by means of which a destination call is selectable according to at least one destination call selection signal. The destination call device comprises a radio device, wherein the radio device activates a data communication between the radio device and a communications unit, which is carried by the user, within a specific range of a radio link section. The radio detects a change in position of the communications unit as a radio signal of greater or lesser strength. The destination call device converts the radio signal into a destination call selection signal.

The elevator installation according to the invention makes use of the advantages of the above-described method. As a consequence of the change in position of the communications unit the desired travel destination, i.e. the destination call, can be contactlessly selected in simple manner.

In a preferred embodiment a movement sensor detects a movement of the user as a positive or negative movement signal.

In a preferred form of embodiment the destination call device comprises a screen on which several fields associated with the destination calls can be imaged, wherein by means of the selecting unit an indicator can be imaged on the screen in accordance with a destination call selection signal and is movable to one of the fields in order to select a destination call.

Advantageously the selecting unit is arranged in such a manner that the indicator after a predetermined period of time is automatically moved from a first field to a second field. In this connection, in particular, the destination call unit can comprise a time unit which recognizes the period of time over which the indicator remains in a field of the screen. The selecting unit or indicator unit is advantageously arranged in such a manner that after expiry of a predetermined period of time in which the indicator or the indicator symbol remains within a field the destination call associated with this field is automatically selected.

In a preferred embodiment several destination call devices are provided, wherein at least one destination call device is arranged in the region of each elevator and/or each floor of the elevator. Thus, for example, in the case of an elevator installation with one elevator a destination call device can be provided at each floor and in the case of an elevator installation with several elevators a number, which corresponds with the number of elevators, of destination call devices can be provided at each floor,

DESCRIPTION OF THE DRAWINGS

The invention is further explained in the following in examples of embodiment with reference to the figures, in which.

DESCRIPTION OF THE PREFERRED EMBODIMENT

Figure 1:
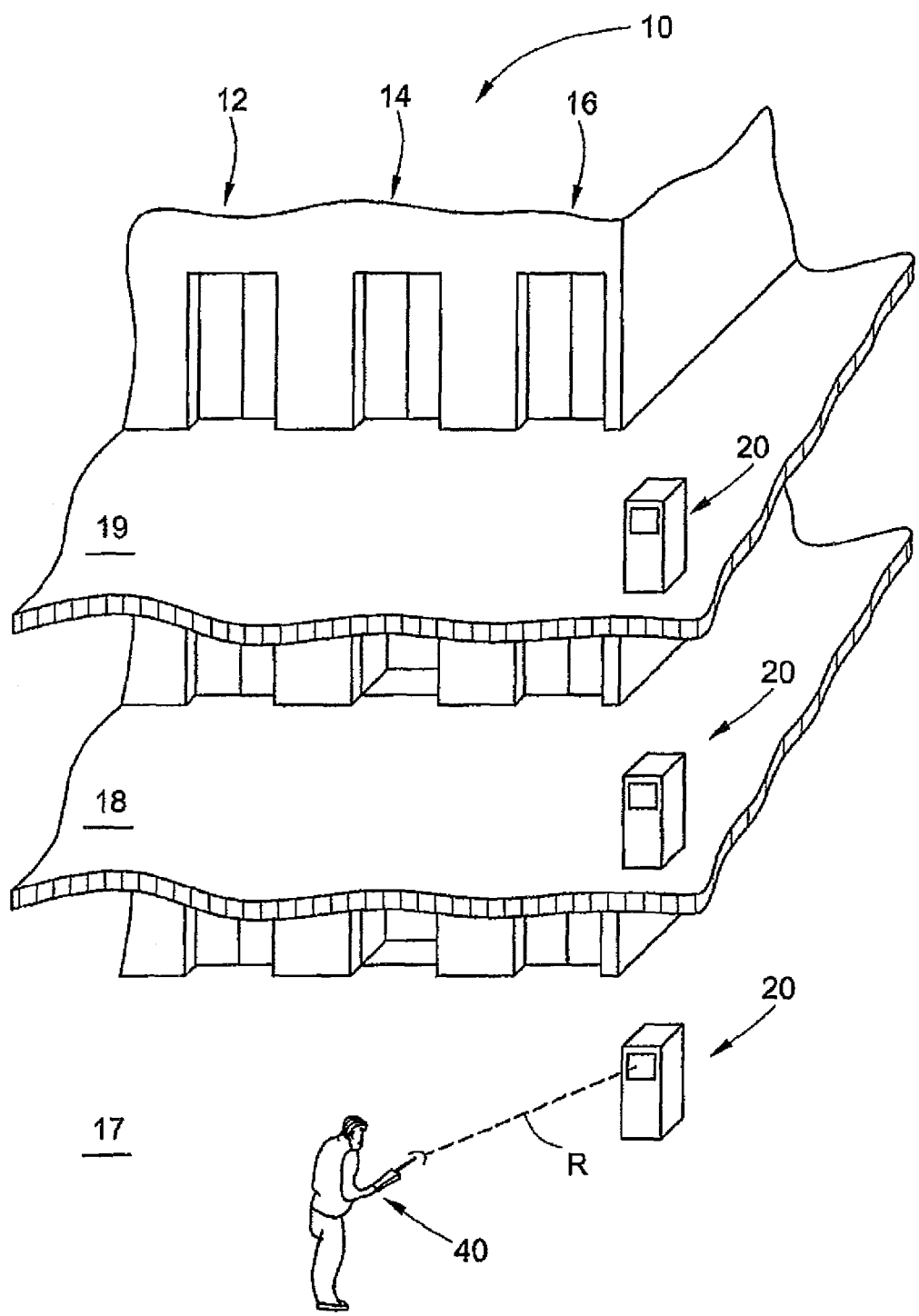
FIG. 1 shows a schematic detail of a building with an elevator installation with three destination call devices with a first example of embodiment where a user contactlessly selects a destination call by means of the communications unit carried by the user.
Figure 2:
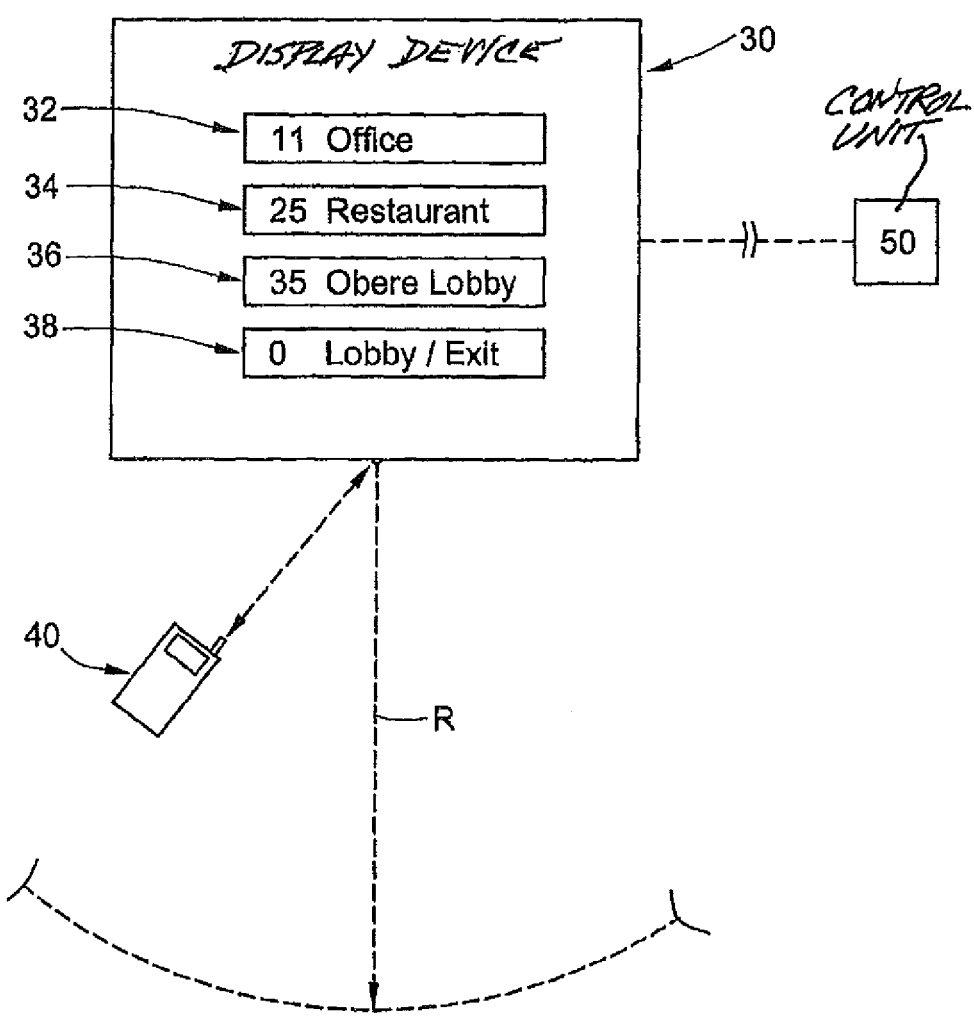
FIG. 2 schematically shows a display device of the destination call devices in the example of embodiment according to FIG. 1.
Figure 3:
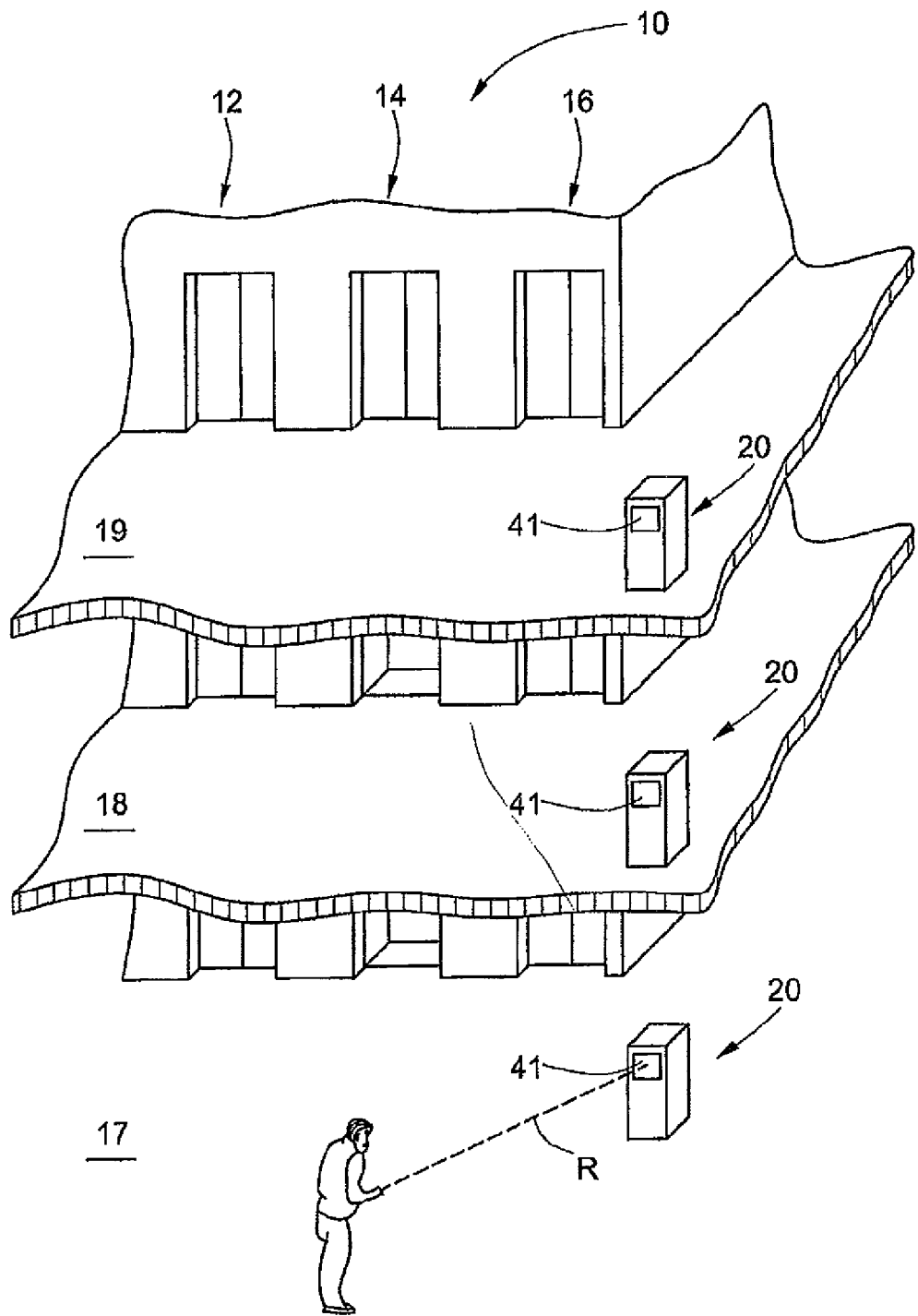
FIG. 3 shows a schematic detail of a building with an elevator installation with three destination call devices with a second example of embodiment where a user contactlessly selects a destination call by changing his or her position.
Figure 4:
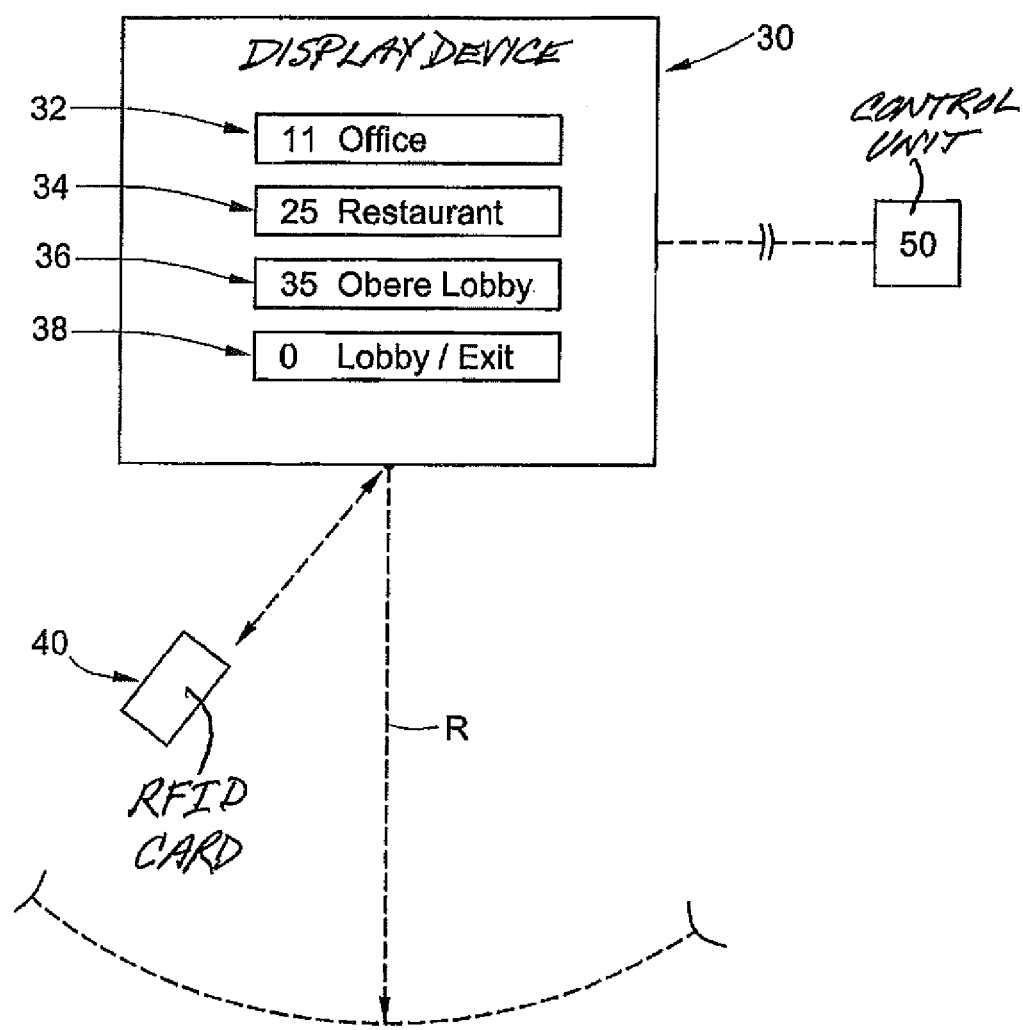
FIG. 4 shows a schematic detail of a building with an elevator installation with a destination call device with a third example of embodiment where a user contactlessly selects a destination call by means of a communications unit carried by the user.

FIGS. 1 and 3 schematically show an elevator installation 10 of a building with a first elevator 12, a second elevator 14 and a third elevator 16, wherein the elevators 12, 14, 16 travel in a common elevator shaft adjacent to one another and independently of one another. Depending on the respective case of use the cars of the elevators 12, 14, 16 can, however, also be arranged one above the other and/or travel in several elevator shafts. In addition, the illustrated section of the building shows a first floor 17, a second floor 18 and a third floor 19, wherein in each floor 17, 18, 19 a respective shaft door leads to one of the elevators 12, 14, 16. Moreover, a respective destination call device 20 in the form of a destination call terminal is provided on each of the floors 17, 18, 19 in the region of the elevator installation 10. As shown in FIGS. 2 and 4, the destination call devices 20 are connected with the control unit 50 by way of at least one data line and/or by radio network.

In the examples of embodiment according to FIGS. 1, 2 and 4 the destination call devices 20 each comprise a respective radio link section device, preferably a near radio link section device, with a receiving/transmitting part, a selecting unit, a time unit, a memory unit and a screen as display device 30. The screen 30 provides a control surface with several fields 32, 34, 36, 38. The fields 32, 34, 36, 38 are associated with the ascertained destination calls. The selecting unit comprises an indicating unit by means of which an indicator can be illustrated on the control surface. The indicator is imaged to be optically recognizable by the user by means of a colored background and/or an indicator symbol on the screen 30 and serves the purpose of marking a specific field and thereby selecting a desired destination call.

On the basis of this system a method for determining a destination call for use of the elevator installation 10 is explained in the following. After a user has entered the building at the first floor 17 (ground floor), the user approaches the elevator installation 10. As soon as the user is in the vicinity, i.e. in a range R of the destination call 20, a near radio link section is generated between the destination call device 20 and a communications unit 40, which is carried by the user, in the form of a mobile telephone and/or an RFID card and enables a data communication between destination call device 20 and communications unit 40. In the case of a near radio link section for communication with a mobile telephone the range R is less than 10 meters and in the case of a near radio link section for communication with an RFID card the range R is less than 1 meter. Activation of the data communication preferably takes place automatically, but can also be triggered by the user himself or herself, for example by means of the communications unit 40 through an appropriate button and/or speech input.

After establishing the data communication a data exchange between destination call device 20 and communications unit 40 takes place, wherein an identification code for identification of the user as well as an access authorization code are automatically transmitted from the communications unit 40 to the destination call device 20.

After receipt of these two codes the destination call device 20 and/or the control unit 50 can establish whether the user is already known and whether this user has an access authorization or which scope this access authorization has. Subsequently, several destination calls are ascertained by the destination call device 20 and/or the control unit 50 and are made known to the user by means of the destination call device 20. For preference, in this connection those destination calls are made known which are most frequently used by the user.

If there should be concerned a new user, i.e. a user not yet known or identified, a listing of the floors as possible travel destinations takes place.

The making known of the destination calls is carried out by optical display of several fields 32, 34, 36, 38 on the screen 30, wherein a destination call is associated with each field 32 to 38. For example, the destination calls associated in FIG. 2 with the fields 32 to 38 can be ascertained. Thus, in each field 32 to 38 at least one travel destination in the form of a floor and optionally an associated destination is indicated. At the uppermost position of the screen 30, i.e. in the field 32, the travel destination most frequently selected in correspondence with the habits of the user is displayed. At the same time this field 32 is colored in the background. This colored background corresponds with the indicator provided by the selecting unit. Alternatively, the indicator or the indicating symbol can be represented by an arrow or the like.

In the present example of embodiment the selecting unit is arranged in such a manner that the fields 32 to 38 are marked by a jumping colored background in succession for a time period of approximately 1 to 2 seconds. In this manner the user can mark the desired field by a change in position and thus the desired destination call.

According to the examples of embodiment of FIGS. 1, 2 and 4 the user can thus select the field 32, which has background in the instantaneous situation, by movement of the communications unit 40 into a region outside the near radio link section. Alternatively, the user can remain together with the communications unit 40 in the instantaneous position relative to the destination call device 20, i.e. he or she essentially does not move the communications unit 40, whereby the field with background during this time period and thus the associated destination call are selected. Through movement or keeping still of the communications unit 40 there is detected by the near radio link section device a radio signal which is of greater or lesser strength and which is converted into a destination call selection signal. The indicator moves over the fields 32, 34, 36, 38 as long as the communications unit 40 is held within the near radio link section and the near radio link section device detects a strong radio signal. As soon as the user holds the communications unit 40 outside the near radio link section, the near radio link section device no longer detects the radio signal, which is converted into a destination call selection signal in that the indicator stops over a field desired by the user and selects an associated destination call.

Finally, the user can, as shown in the example of embodiment according to FIG. 3, also change his or her position relative to at least one movement sensor 41. The movement sensor 41 can be arranged in the region of the elevator installation 10 or also within or at the destination call device 20. Thus, a movement sensor 41 can be arranged on each floor 17, 18, 19 in the region of the elevator installation 10. Such movement sensors 41 are known to the expert. The movement sensors 41 are connected with the destination call devices 20 and/or the control unit 50 by way of at least one data line and/or by radio network. A movement or standstill of the user is detected by the movement sensor 41 as positive or negative movement signal. The movement signal is communicated by way of the data line to the destination call devices 20 and/or the control unit 50 and converted there into at least one destination call selection signal. The indicator moves over the fields 32, 34, 36, 38 as long as the user does not move and the movement sensor 41 detects a negative movement signal. As soon as the user moves, for example raises a hand, the movement sensor 41 detects a positive movement signal, which is converted into a destination call selection signal in that the indicator stops above a field desired by the user and selects an associated destination call.

After selection of the destination call this is communicated to the control unit 50 and a suitable elevator for serving the destination call is ascertained. After the control unit 50 has ascertained the suitable elevator the control unit 50 transmits information data for guidance of the user to the destination call device 20, which are, for example, made known optically on the screen 30. Alternatively or additionally these data can be transmitted to the communications unit 40. On the basis of these data the user can move to the corresponding elevator. This proves particularly useful when the ascertained elevator is located in a part of the building remote from the instantaneous location.

If the user should not desire, as destination call, the travel destination recommended by the control unit 50 by the marked field 32 he or she can change the elevator destination call by positional change and select another destination call. For example, he or she can move the communications unit 40 from the instantaneous position further away from the destination call device 20, whereby the colored background jumps to the second field 34. Through remaining in this position for a certain period of time the destination call associated with the second field 34 is marked and selected and is communicated to the control unit 50.

The method and the elevator installation 10 are distinguished by, in particular, the fact that the user can fix the desired destination call substantially contactlessly and he or she can in case of need interactively change the selection of the destination call. In particular, the user does not have to contact the destination call device 20, which is used by a multiplicity of persons, in order to be able to deliver or change the desired destination call.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method of determining a destination call for use by an elevator installation having a control unit and at least one destination call device, comprising the steps of:
    activating data communication between the at least one destination call device and a communications unit carried by a user when the communications unit is within a specific range of a radio link section of the destination call device;
    positioning the communications unit in the ratio link section by at least one of a movement and substantially keeping still;
    detecting a change in position of the communications unit as a radio signal of greater or lesser strength; and
    converting the detected radio signal into a destination call selection signal for use by the control unit.

2. The method according to claim 1 wherein the communications unit is one of a mobile telephone and an RFID card.

3. The method according to claim 1 wherein the radio link section is a near radio link section and including at least one of:
    selecting a destination call by movement of the communications unit out of the near radio link section;
    selecting a destination call by movement of the communications unit while in the near radio link section;
    providing a range of the near radio link section of less than 10 meters; and
    automatically activating the data communication between the destination call device and the communications unit within the near radio link section.

4. The method according to claim 1 wherein a movement of the user or the communications unit is detected as a positive movement signal, a standstill of the user or the communications unit is detected as a negative movement signal, and the detected movement signal is converted into the destination call selection signal.

5. The method according to claim 4 wherein the movement signal is automatically recognized by at least one movement sensor.

6. The method according to claim 1 including displaying several fields and an indicator on a screen of the destination call device, wherein a different destination call is associated with each of the fields, and guiding the indicator over the fields in accordance with the destination call selection signal.

7. The method according to claim 1 including displaying several fields and an indicator on a screen of the destination call device, wherein a different destination call is associated with each of the fields, guiding the indicator over the fields in response to detection of the radio signal as a negative movement signal, and stopping the indicator over one of the fields upon detecting the radio signal as a positive movement signal.

8. The method according to claim 7 including guiding the indicator over the fields in a predetermined sequence, the indicator remaining on each of the fields for a predetermined time period, and selecting the associated destination call when the indicator is stopped.

9. The method according to claim 1 including one of communicating an identification signal for identification of the user from the communications unit to the destination call device, and inputting an identification code at a terminal and communicating the identification code as an identification signal to the destination call device.

10. The method according to claim 9 including checking the communicated identification signal with the destination call device and if the checking of the identification signal is successful, ascertaining of several destination calls and making known the destination calls to the user.

11. The method according to claim 1 including communicating an access authorization code from the user to the destination call device and checking the access authorization code to determine whether the user has an access authorization to the elevator installation.

12. The method according to claim 1 including communicating data for guidance of the user to an elevator of the elevator installation to the destination call device or to the communications unit.

13. The method according to claim 1 including at least one of:
generating from the destination call device at least one destination call recommended for the user;
generating from the destination call device destination calls of greatest probability for the user;
generating from the destination call device destination calls by at least one of acoustic, optic and vibration indication; and
generating from the destination call device to the communications unit data for guidance of the user to an elevator of the elevator installation and indicating the data to the user by at least one of acoustically, optically and vibration from the communications unit.

14. An elevator installation having at least one elevator, a control unit and at least one destination call device, wherein the at least one destination call device indicates to a user any of a plurality destination calls, comprising:
the at least one destination call device is responsive to a destination call section signal for selecting one of the plurality of destination calls;
a communications unit carried by the user wherein the at least one destination call device includes a radio device that activates a data communication between the radio device and the communications unit when the communications device is within a specific range of a radio link section of the radio device;
said radio device detects a movement of the communications unit as a radio signal of greater or lesser strength; and
the at least one destination call device converts the radio signal into the destination call selection signal.

15. The elevator installation according to claim 14 including a movement sensor for detecting a movement of the user as a positive movement signal and a standstill of the user as a negative movement signal, and wherein one of the destination call device and the control unit converts the movement signal into the destination call section signal.

16. The elevator installation according to claim 14 wherein said communications unit is one of a mobile telephone and an RFID card.

17. The elevator installation according to claim 14 wherein the radio link section is a near radio link section.

18. The elevator installation according to claim 14 wherein the at least one destination call device includes a screen on which a plurality of fields each associated with a different one of the destination calls are displayed and an indicator is displayed, the at least one destination call device being responsive to the destination call selection signal for moving said indicator among said fields to select one of the destination calls.

19. The elevator installation according to claim 18 wherein the destination call device automatically moves said indicator from one of said fields to another of said fields after a predetermined time period.

20. The elevator installation according to claim 14 having a plurality of floors served by the at least one elevator and including a plurality of the at least one destination call device, and wherein each of the destination call devices is arranged in a region of at least one of each of the floors and each elevator of the elevator installation.

\* \* \* \* \*